US012803426B2

(12) United States Patent
Tan et al.

(10) Patent No.: US 12,803,426 B2
(45) Date of Patent: Nov. 17, 2026

(54) SYNCHRONOUS RECTIFICATION DRIVE METHODS AND RELATED DRIVE CIRCUITS FOR TOTEM POLE POWER FACTOR CORRECTION (PFC)

(71) Applicant: Eaton Intelligent Power Limited, Dublin (IE)

(72) Inventors: Tianfeng Tan, Shenzhen (CN); Meng Tian, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 162 days.

(21) Appl. No.: 18/888,356

(22) Filed: Sep. 18, 2024

(65) Prior Publication Data

US 2025/0105727 A1 Mar. 27, 2025

(30) Foreign Application Priority Data

Sep. 25, 2023 (CN) ......................... 202311244426.7

(51) Int. Cl.
*H02M 1/42* (2007.01)
*H02M 1/08* (2006.01)
(Continued)

(52) U.S. Cl.
CPC ........... *H02M 1/4233* (2013.01); *H02M 1/08* (2013.01); *H02M 1/4208* (2013.01); *H02M 7/217* (2013.01); *H02M 1/0054* (2021.05)

(58) Field of Classification Search
CPC .... H02M 1/42; H02M 1/4208; H02M 1/4233; H02M 7/217; H02M 7/219
See application file for complete search history.

(56) References Cited

U.S. PATENT DOCUMENTS 12,463,530 B2 * 11/2025 Yeh ..................... H02M 1/4233
2016/0241132 A1 * 8/2016 Lin ..................... H02M 1/4225

FOREIGN PATENT DOCUMENTS

CN 109217652 A * 1/2019 .......... H02M 1/4208
CN 114598140 A * 6/2022 .............. H02M 1/08
TW 201406024 A * 2/2014 .......... H02M 1/4233

OTHER PUBLICATIONS

TW201406024_Translation (Year: 2014).*
CN109217652_Translation (Year: 2019).*
CN114598140_Translation (Year: 2022).*

* cited by examiner

*Primary Examiner* — Gary L Laxton
*Assistant Examiner* — Jennifer C Caulk
(74) *Attorney, Agent, or Firm* — Stanek Lemon Crouse & Meeks, PA

(57) ABSTRACT

A synchronous rectification drive method and drive circuit for totem pole PFC are provided. The drive method includes: in a positive half-cycle, providing a first pulse width modulation (PWM) signal to the second switching transistor, switching on the fourth switching transistor, switching off the first and the third switching transistor first, and when a sampling voltage is greater than a predetermined first voltage, providing a second PWM signal to the first switching transistor, where the second PWM signal is opposite to the first PWM signal; and in a negative half-cycle, providing a third PWM signal to the first switching transistor, switching on the third switching transistor, switching off the second and the fourth switching transistor first, and when the sampling voltage is less than a predetermined second voltage, providing a fourth PWM signal to the second switching transistor, where the fourth PWM signal is opposite to the third PWM signal.

10 Claims, 8 Drawing Sheets

(51) Int. Cl.
*H02M 7/217* (2006.01)
*H02M 1/00* (2006.01)

SYNCHRONOUS RECTIFICATION DRIVE METHODS AND RELATED DRIVE CIRCUITS FOR TOTEM POLE POWER FACTOR CORRECTION (PFC)

CROSS-REFERENCE TO RELATED APPLICATION

The present application claims the priority of Chinese Patent Application No. 202311244426.7, filed Sep. 25, 2023, the content of which is hereby incorporated herein by reference in its entirety.

TECHNICAL FIELD

The present inventive concept relates to the field of electronic circuits, and in particular, to a synchronous rectification drive method and drive circuit for totem pole power factor correction (PFC).

BACKGROUND

Currently, totem pole power factor correction (PFC) does not have a hardware-driven solution for synchronous rectification. During freewheeling, a current flows from a body diode connected in parallel with a switching transistor, which results in relatively high system losses and affects overall efficiency of a system. Therefore, there is a need for a drive method and a drive circuit that can reduce circuit losses of the totem pole PFC.

SUMMARY

Based on the foregoing problems in the conventional technology, the present invention provides a synchronous rectification drive method for totem pole PFC. The totem pole PFC includes a first branch having a first switching transistor and a second switching transistor that are connected in series and a second branch having a third switching transistor and a fourth switching transistor that are connected in series. The first branch is connected in parallel with the second branch. The drive method includes: in a positive half-cycle, providing a first pulse width modulation (PWM) signal to a control terminal of the second switching transistor, switching on the fourth switching transistor, switching off the first switching transistor and the third switching transistor first, and when a sampling voltage on an inductor is greater than a predetermined first voltage, providing a second PWM signal to a control terminal of the first switching transistor, where the second PWM signal is opposite to the first PWM signal; and in a negative half-cycle, providing a third PWM signal to the control terminal of the first switching transistor, switching on the third switching transistor, switching off the second switching transistor and the fourth switching transistor first, and when the sampling voltage on the inductor is less than a predetermined second voltage, providing a fourth PWM signal to the control terminal of the second switching transistor, where the fourth PWM signal is opposite to the third PWM signal.

In some embodiments, the first voltage and the second voltage are dynamically adjusted based on efficiency and input current harmonics of a circuit system, to maximize the efficiency.

The present inventive concept further provides a synchronous rectification drive circuit for totem pole PFC. The totem pole PFC includes a first branch having a first switching transistor and a second switching transistor that are connected in series and a second branch having a third switching transistor and a fourth switching transistor that are connected in series, and the first branch is connected in parallel with the second branch. The drive circuit includes: a first switching transistor drive circuit, including: a first voltage comparison circuit, including a third comparator, configured to output a first control signal to a control terminal of the first switching transistor when a sampling voltage of an inductor is greater than a first voltage, and pull down the control terminal of the first switching transistor to a low level when the sampling voltage is less than the first voltage; and a first inverting input control circuit, configured to pull down an inverting input of the third comparator to a low level when a third control signal of the third switching transistor is at a high level; and a second switching transistor drive circuit, including: a second voltage comparison circuit, including a first comparator, configured to output a second control signal to a control terminal of the second switching transistor when the sampling voltage is less than a second voltage, and pull down the control terminal of the second switching transistor to a low level when the sampling voltage is greater than the second voltage; and a second inverting input control circuit, configured to pull down an inverting input of the first comparator to a low level when a fourth control signal of the fourth switching transistor is at a high level.

In some embodiments, a non-inverting input of the third comparator is configured to receive the sampling voltage, an inverting input of the third comparator is configured to receive the first voltage, and the first voltage comparison circuit further includes: a tenth resistor, connected between the non-inverting input of the third comparator and the sampling voltage; a fourteenth diode, connected between an output terminal of the third comparator and the control terminal of the first switching transistor; and a sixteenth resistor, connected between the first control signal and the control terminal of the first switching transistor.

In some embodiments, the first inverting input control circuit further includes: a twelfth switching transistor, connected between the inverting input of the third comparator and a ground; a seventeenth resistor, connected between a control terminal of the twelfth switching transistor and the third control signal; and an eighteenth resistor, connected between the control terminal of the twelfth switching transistor and the ground.

In some embodiments, a non-inverting input of the first comparator is configured to receive the second voltage, an inverting input of the first comparator is configured to receive the sampling voltage, and the second voltage comparison circuit further includes: a second resistor, connected between the inverting input of the first comparator and the sampling voltage; a twelfth diode, connected between an output terminal of the first comparator and the control terminal of the second switching transistor; and a seventh resistor, connected between the second control signal and the control terminal of the second switching transistor.

In some embodiments, the second inverting input control circuit further includes: an eleventh switching transistor, connected between the inverting input of the first comparator and a ground; an eighth resistor, connected between a control terminal of the eleventh switching transistor and the fourth control signal; and a ninth resistor, connected between the control terminal of the eleventh switching transistor and the ground.

In some embodiments, the first switching transistor drive circuit further includes a first ripple control circuit, configured to clamp an output of the third comparator in one switching cycle of the first control signal.

In some embodiments, the first ripple control circuit includes: a fourth comparator, where a non-inverting input of the fourth comparator is configured to receive a fourth reference voltage, an inverting input of the fourth comparator is configured to receive the first control signal, and an output terminal of the fourth comparator is connected to an output terminal of the third comparator; a fourteenth resistor, connected between the non-inverting input of the fourth comparator and the fourth reference voltage; a thirteenth resistor, connected between the non-inverting input of the fourth comparator and an output terminal of the fourth comparator; and a fifteenth resistor, connected between the inverting input of the fourth comparator and a ground.

The fourth reference voltage, the fourteenth resistor, and the thirteenth resistor are selected as: when the third comparator outputs a low level, a voltage at the non-inverting input of the fourth comparator is less than a voltage at the inverting input of the fourth comparator, and when the third comparator outputs a high level, the voltage at the non-inverting input of the fourth comparator is greater than the voltage at the inverting input of the fourth comparator.

In some embodiments, the second switching transistor drive circuit further includes a second ripple control circuit, configured to clamp an output of the first comparator in one switching cycle of the second control signal.

In some embodiments, the second ripple control circuit includes: a second comparator, where a non-inverting input of the second comparator is configured to receive a second reference voltage, an inverting input of the second comparator is configured to receive the second control signal, and an output terminal of the second comparator is connected to an output terminal of the first comparator; a fifth resistor, connected between the non-inverting input of the second comparator and the second reference voltage; a fourth resistor, connected between the non-inverting input of the second comparator and the output terminal of the second comparator; and a sixth resistor, connected between the inverting input of the second comparator and a ground.

The second reference voltage, the fourth resistor, and the fifth resistor are selected as: when the first comparator outputs a low level, a voltage at the non-inverting input of the second comparator is less than a voltage at the inverting input of the second comparator, and when the first comparator outputs a high level, the voltage at the non-inverting input of the second comparator is greater than the voltage at the inverting input of the second comparator.

According to the synchronous rectification drive method and drive circuit for totem pole PFC in the present inventive concept, a loss of a switching transistor during freewheeling can be reduced, and efficiency of a system can be improved.

DETAILED DESCRIPTION

To make the objectives, technical solutions, and advantages of the present invention clearer, the following further describes the present inventive concept in detail through the embodiments with the reference to the accompanying drawings. It should be noted that the embodiments provided in the present inventive concept are used only for description, and are not intended to limit the protection scope of the present inventive concept.

Figure 1:
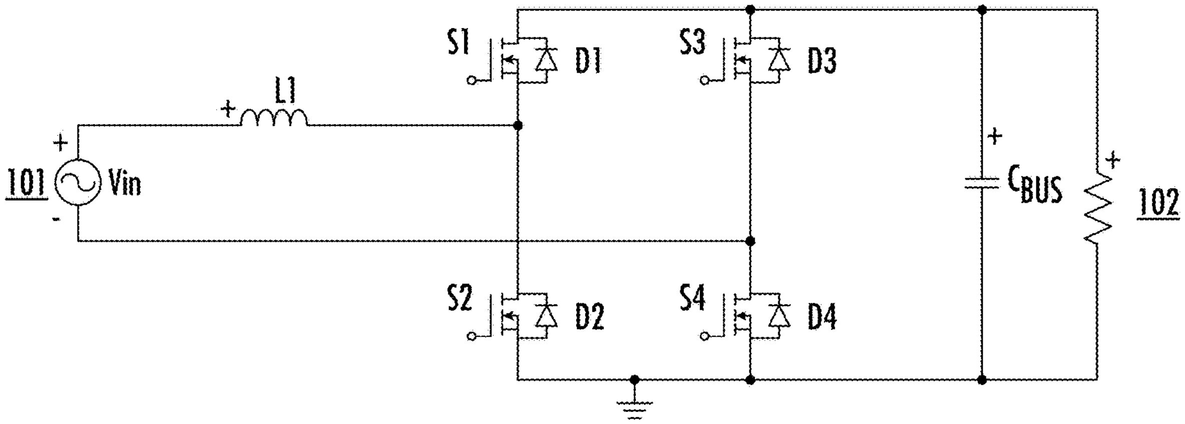
FIG. 1 illustrates a schematic diagram of a totem pole power factor correction (PFC) circuit.

FIG. 1 illustrates a schematic diagram of a totem pole power factor correction (PFC) circuit in the conventional technology. As illustrated in FIG. 1, the totem pole PFC circuit is configured to supply power to a load 102, and includes a power supply 101, an inductor L1, switching transistors S1-S4, and a DC bus capacitor $C_{BUS}$. The switching transistors S1 and S2 are connected in series, and the switching transistors S3 and S4 are connected in series. One terminal of the inductor L1 is connected to a positive electrode of the power supply 101, the other terminal is connected to a node between the switching transistors S1 and S2, and a negative electrode of the power supply 101 is connected to a node between the switching transistors S3 and S4. The capacitor $C_{BUS}$ is connected in parallel with a branch having the switching transistors S1 and S2 and a branch having the switching transistors S3 and S4. The power supply 101 is an alternating current power supply, for example, a mains supply. The switching transistors S1, S2, S3, and S4 each have a control terminal for receiving a control signal, and respectively have body diodes D1, D2, D3, and D4 that are parallel with corresponding switching transistors.

In some embodiments, the switching transistors S1 and S2 are rapidly switched SiC-MOSFET devices (operating at a high carrier frequency), and the switching transistors S3 and S4 are conventional low-speed Si-MOSFET devices (operating at 50 Hz or 60 Hz).

Figure 2:
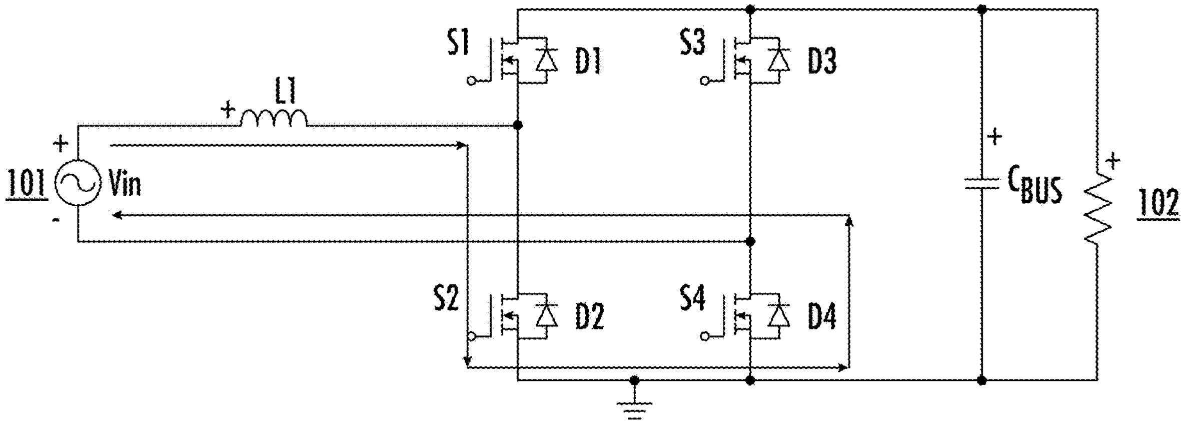
FIG. 2 illustrates a current path when a switching transistor S2 is switched on in a positive half-cycle of a power supply.
Figure 3:
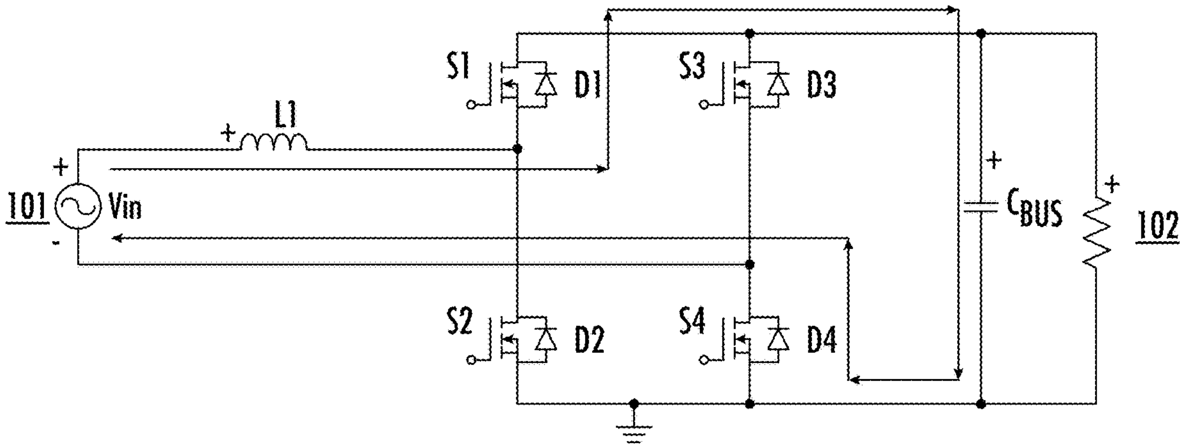
FIG. 3 illustrates a current path when a switching transistor S2 is switched off in a positive half-cycle of a power supply.

In a positive half-cycle of the power supply, the switching transistor S2 is used as a main switch, the switching transistor S1 is used as a synchronous rectification switch, and the switching transistor S4 is always switched on and serves as a resistor. The control terminal of the switching transistor S2 is configured to receive a PWM signal for controlling the switching transistor S2 to be periodically switched on and off. FIG. 2 illustrates a current path when the switching transistor S2 is switched on in the positive half-cycle of the power supply. As illustrated in FIG. 2, the current path is: the positive electrode of the power supply 101—the inductor L1—the switching transistor S2—the switching transistor S4—the negative electrode of the power supply 101. When the switching transistor S2 is switched on, the AC power supply 101 stores energy in the inductor L1, and the output capacitor $C_{BUS}$ provides a load current. FIG. 3 illustrates a current path when the switching transistor S2 is switched off in the positive half-cycle of the power supply. As illustrated in FIG. 3, the current path is: the positive electrode of the power supply 101—the inductor L1—the body diode D1 of the switching transistor S1—the capacitor $C_{BUS}$—the switching transistor S4—the negative electrode of the power supply 101. When the switching transistor S2 is switched off, the AC power supply and the energy in the inductor L1 provide a load current and charge the output capacitor $C_{BUS}$.

Figure 4:
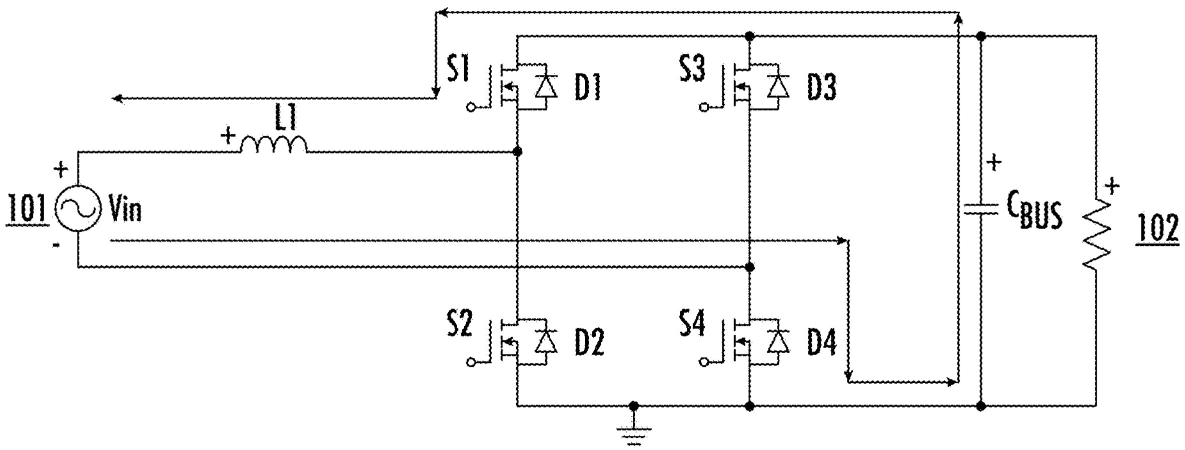
FIG. 4 illustrates a current path when a switching transistor S2 is switched off and a switching transistor S1 is switched on when an inductor current is small and a power supply voltage is low in a positive half-cycle of a power supply.

It may be learned from FIG. 3 that when the switching transistor S2 is switched off, the current path passes through the body diode D1 of the switching transistor S1, which increases a circuit loss and reduces overall efficiency. The switching transistor S1 may be switched on, so that the current path directly passes through the switching transistor S1 without passing through the body diode D1 of the switching transistor S1, thereby reducing the loss. However, the inventors found that when an inductor current is small and a power supply voltage is low, switching on the switching transistor S1 when the switching transistor S2 is switched off consumes energy on the output capacitor $C_{BUS}$, thereby reducing circuit efficiency. FIG. 4 illustrates a current path when the switching transistor S2 is switched off, the switching transistor S1 is switched on, the inductor current is small and the power supply voltage is low in the positive half-cycle of the power supply. As illustrated in FIG. 4, the following current path exists: the negative electrode of the power supply 101—the switching transistor S4—the capacitor $C_{BUS}$—the switching transistor S1—the inductor L1—the positive electrode of the power supply 101. In the positive half-cycle of the power supply, when the power supply voltage is small, i.e., the energy stored on the inductor L1 is insufficient, a reverse current from the capacitor $C_{BUS}$ exists, and therefore, the power supply 101 consumes energy on the capacitor $C_{BUS}$, thereby reducing the circuit efficiency.

Figure 5:
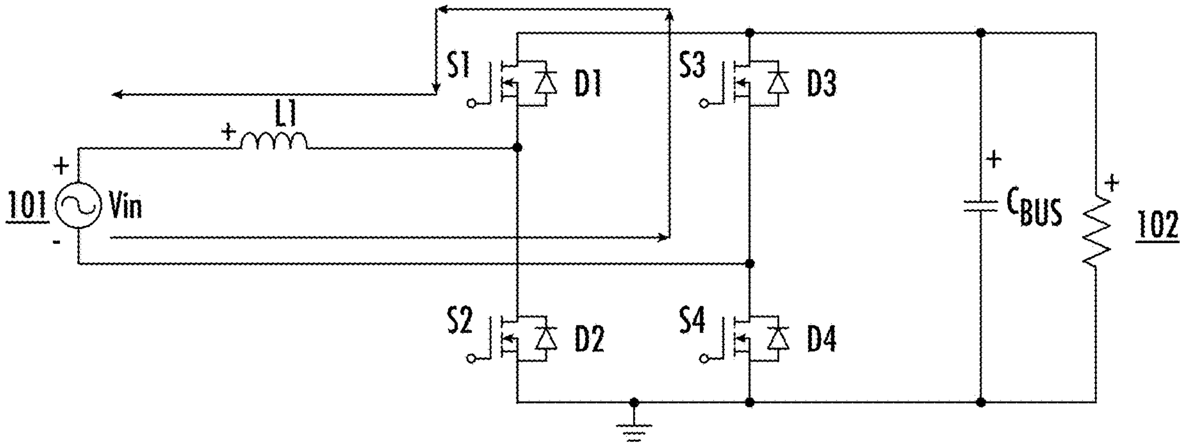
FIG. 5 illustrates a current path when a switching transistor S1 is switched on in a negative half-cycle of a power supply.
Figure 6:
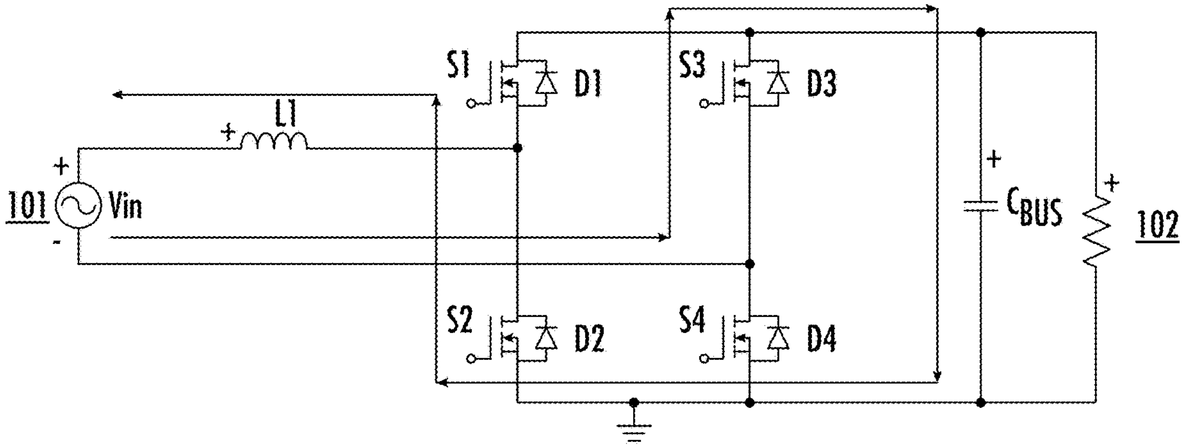
FIG. 6 illustrates a current path when a switching transistor S1 is switched off in a negative half-cycle of a power supply.

Similarly, in a negative half-cycle, the switching transistor S1 is used as a main switch, the switching transistor S2 is used as a synchronous rectification switch, and the switching transistor S3 is always switched on and serves as a resistor. The control terminal of the switching transistor S1 is configured to receive a PWM signal for controlling the switching transistor S1 to be periodically switched on and off. FIG. 5 illustrates a current path when the switching transistor S1 is switched on in the negative half-cycle of the power supply. As illustrated in FIG. 5, the current path is: the negative electrode of the power supply 101—the switching transistor S3—the switching transistor S1—the inductor L1—the positive electrode of the power supply 101. When the switching transistor S1 is switched on, the AC power supply 101 stores energy in the inductor L1, and the output capacitor $C_{BUS}$ provides a load current. FIG. 6 illustrates a current path when the switching transistor S1 is switched off in the negative half-cycle of the power supply. As illustrated in FIG. 6, the current path is: the negative electrode of the power supply 101—the switching transistor S3—the capacitor $C_{BUS}$—the body diode D2 of the switching transistor S2—the inductor L1—the positive electrode of the power supply 101. When the switching transistor S1 is switched off, the AC power supply and the energy in the inductor L1 provide a load current and charge the output capacitor $C_{BUS}$.

Figure 7:
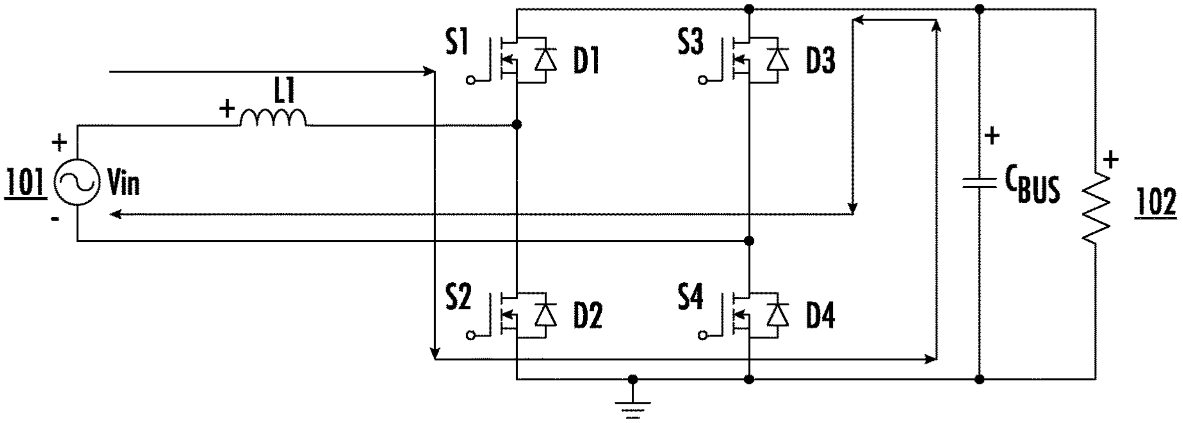
FIG. 7 illustrates a current path when a switching transistor S1 is switched off and a switching transistor S2 is switched on when an inductor current is small and a power supply voltage is low in a negative half-cycle of a power supply.

It may be learned from FIG. 6 that when the switching transistor S1 is switched off, the current path passes through the body diode D2 of the switching transistor S2, which increases the circuit loss and reduces the overall efficiency. The switching transistor S2 may be switched on, so that the current path directly passes through the switching transistor S2 without passing through the body diode D2 of the switching transistor S2, thereby reducing the loss. However, the inventors found that when the inductor current is small and the power supply voltage is low, switching on the switching transistor S2 when the switching transistor S1 is switched off consumes energy on the output capacitor $C_{BUS}$, thereby reducing the circuit efficiency. FIG. 7 illustrates a current path when the switching transistor S1 is switched off, the switching transistor S2 is switched on, the inductor current is small and the power supply voltage is low in the negative half-cycle of the power supply. As illustrated in FIG. 7, the following current path exists: the positive electrode of the power supply 101—the inductor L1—the switching transistor S2—the capacitor $C_{BUS}$—the switching transistor S3—the negative electrode of the power source 101. In the negative half-cycle of the power supply, when the power supply voltage is small, i.e., the energy stored on the inductor L1 is insufficient, a reverse current from the capacitor $C_{BUS}$ exists, and therefore, the power supply 101 consumes the energy on the capacitor $C_{BUS}$, thereby reducing the circuit efficiency.

Figure 8:
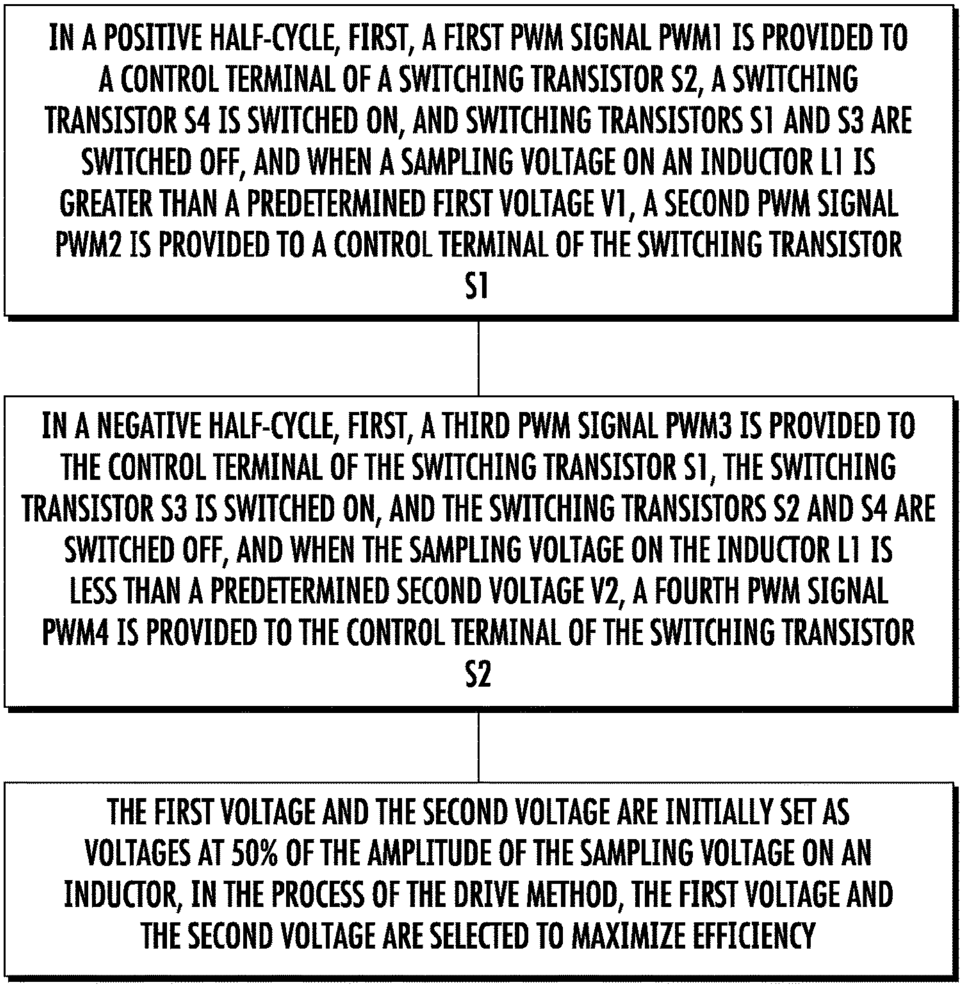
FIG. 8 is a flowchart illustrating synchronous rectification drive methods for totem pole PFC according to some embodiments of the present inventive concept.

Based on the foregoing content, the present inventive concept provides a synchronous rectification drive method for totem pole PFC. FIG. 8 illustrates a flowchart of a synchronous rectification drive method for totem pole PFC according to some embodiments of the present inventive concept. The method includes:

In the positive half-cycle, first, the first PWM signal PWM1 is provided to the control terminal of the switching transistor S2, the switching transistor S4 is switched on, and the switching transistors S1 and S3 are switched off, and when the sampling voltage on the inductor L1 is greater than the predetermined first voltage V1, the second PWM signal PWM2 is provided to the control terminal of the switching transistor S1, where the second PWM signal PWM2 is opposite to the first PWM signal PWM1. In some embodiments, the first PWM signal PWM1 is a BOOST voltage-boosting high-frequency switch signal, and the second PWM signal PWM2 is a synchronous rectification high-frequency switch signal.

In the negative half-cycle, first, the third PWM signal PWM3 is provided to the control terminal of the switching transistor S1, the switching transistor S3 is switched on, and the switching transistors S2 and S4 are switched off, and when the sampling voltage on the inductor L1 is less than the predetermined second voltage V2, the fourth PWM signal PWM4 is provided to the control terminal of the switching transistor S2, where the fourth PWM signal PWM4 is opposite to the third PWM signal PWM3. In some embodiments, the third PWM signal PWM3 is a BOOST rectification high-frequency switch signal, and the fourth PWM signal PWM4 is a synchronous rectification high-frequency switch signal.

An amplitude of the first voltage V1 and an amplitude of the second voltage V2 are configured, so that a synchronous rectification interval can be controlled. The first voltage V1 and the second voltage V2 are selected to avoid the current paths illustrated in FIG. 4 and FIG. 7.

A sampling current on the inductor L1 is detected, and the sampling voltage Vs on the inductor L1 is obtained by converting the sampling current into a voltage and then superimposing a direct current voltage signal on the voltage, so that the sampling voltage Vs is a positive value. A method for obtaining the sampling voltage Vs is a known technology in the art, and details are not described herein again.

Figure 9:
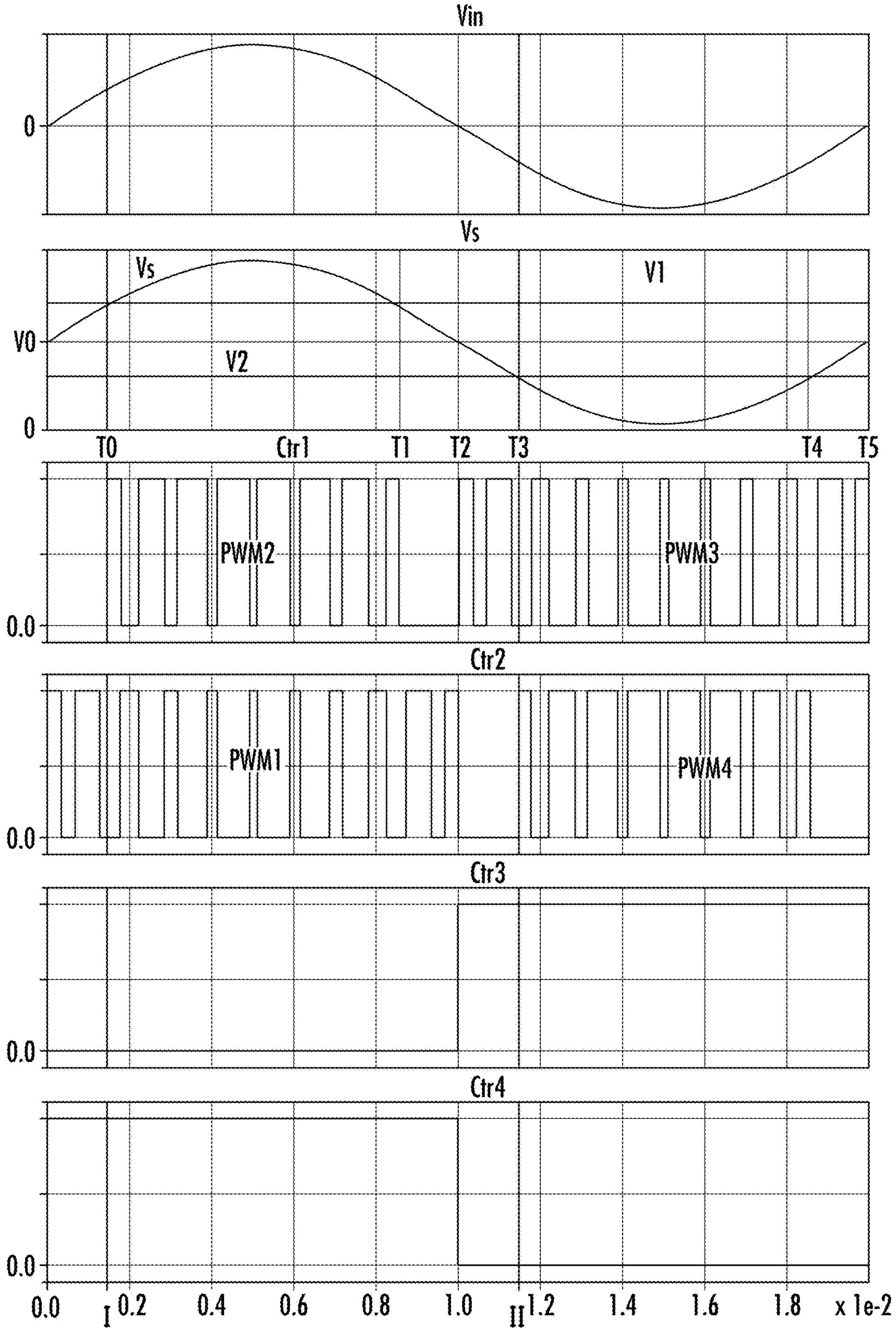
FIG. 9 is a schematic diagram illustrating different signals in a synchronous rectification drive method for totem pole PFC according to some embodiments of the present inventive concept.

FIG. 9 illustrates a schematic diagram of different signals in the synchronous rectification drive method for totem pole PFC according to the present inventive concept. A power supply voltage Vin, a sampling voltage Vs, a first voltage V1, a second voltage V2, a superposed direct current voltage signal V0, a control signal Ctr1 of a first switching transistor, a control signal Ctr2 of a second switching transistor, a control signal Ctr3 of a third switching transistor, and a control signal Ctr4 of a fourth switching transistor are illustrated in FIG. 9. As illustrated in FIG. 9, 0-T2 is a positive half-cycle, and T2-T5 is a negative half-cycle. With reference to FIG. 9, the synchronous rectification drive method for totem pole PFC according to the present inventive concept is further described.

In a period 0-T0, the switching transistor S2 receives a first PWM signal PWM1, the switching transistor S4 is switched on, and the switching transistor S3 is switched off. In this case, because the sampling voltage Vs is less than the first voltage V1, the switching transistor S1 is switched off.

In a period T0-T1, the switching transistor S2 receives the first PWM signal PWM1, the switching transistor S4 is switched on, and the switching transistor S3 is switched off. In this case, because the sampling voltage Vs is greater than the first voltage V1, the switching transistor S1 is switched on and receives a second PWM signal PWM2.

In a period T1-T2, the switching transistor S2 receives the first PWM signal PWM1, the switching transistor S4 is switched on, and the switching transistor S3 is switched off. In this case, because the sampling voltage Vs is less than the first voltage V1, the switching transistor S1 is switched off.

Therefore, in the positive half-cycle, the switching transistor S1 is switched on only in the period T0-T1, and is switched off in the periods 0-T0 and T1-T2 in which the power supply voltage is relatively small, so that when the power supply voltage is relatively small, i.e., energy stored on the inductor L1 is insufficient, a reverse current from a capacitor $C_{BUS}$ is avoided, i.e., consumption of energy on the capacitor $C_{BUS}$ by a power supply 101 is avoided, and circuit efficiency is improved.

In a period T2-T3, the switching transistor S1 receives a third PWM signal PWM3, the switching transistor S3 is switched on, and the switching transistor S4 is switched off. In this case, because the sampling voltage Vs is greater than the second voltage V2, the switching transistor S2 is switched off.

In a period T3-T4, the switching transistor S1 receives the third PWM signal PWM3, the switching transistor S3 is switched on, and the switching transistor S4 is switched off. In this case, because the sampling voltage Vs is less than the second voltage V2, the switching transistor S2 is switched on and receives a fourth PWM signal PWM4.

In a period T4-T5, the switching transistor S1 receives the third PWM signal PWM3, the switching transistor S3 is switched on, and the switching transistor S4 is switched off. In this case, because the sampling voltage Vs is greater than the second voltage V2, the switching transistor S2 is switched off.

Therefore, in the negative half-cycle, the switching transistor S2 is switched on only in the period T3-T4, and is switched off in the periods T2-T3 and T4-T5 in which an amplitude of the power supply voltage is relatively small, so that when the power supply voltage is relatively small, i.e., the energy stored on the inductor L1 is insufficient, a reverse current from the capacitor $C_{BUS}$ is avoided, i.e., the consumption of the energy on the capacitor $C_{BUS}$ by the power supply 101 is avoided, and the circuit efficiency is improved.

In conclusion, a driving signal of the switching transistor S4 is constantly high in the positive half-cycle and constantly low in the negative half-cycle. A driving signal of the switching transistor S3 is opposite to the driving signal of the switching transistor S4, and is constantly low in the positive half-cycle and constantly high in the negative half-cycle. A driving signal of the switching transistor S2 in 0-T2 is a BOOST voltage-boosting high-frequency switch signal, and a driving signal in T3-T4 is a synchronous rectification high-frequency switch signal. A driving signal of the switching transistor S1 in T0-T1 is a synchronous rectification high-frequency switch signal, and a driving signal in T2-T5 is a BOOST rectification high-frequency switch signal.

The selection of the first voltage V1 and the second voltage V2 affects efficiency and input current harmonics of the system, and the amplitudes of the first voltage V1 and the second voltage V2 may be dynamically adjusted to maximize efficiency of the system. In some embodiments, the first voltage V1 and the second voltage V2 may be initially set as voltages at 50% of the amplitude of the sampling voltage, then synchronous rectification is started, and the first voltage V1 and the second voltage V2 are dynamically adjusted based on the efficiency and input current harmonics of the system, so that the efficiency of the system is maximized. In another embodiment, the first voltage V1 and the second voltage V2 are fixed values.

The synchronous rectification drive method for totem pole PFC in the present inventive concept may be implemented by using software or by using hardware. In some embodiments, the PWM signals used to drive the switching transistors S1 and S2 may be designed by using a digital signal processor (DSP) to implement the method of the present inventive concept. In another embodiment, a corresponding hardware drive circuit may be designed to implement the method of the present inventive concept.

Figure 10:
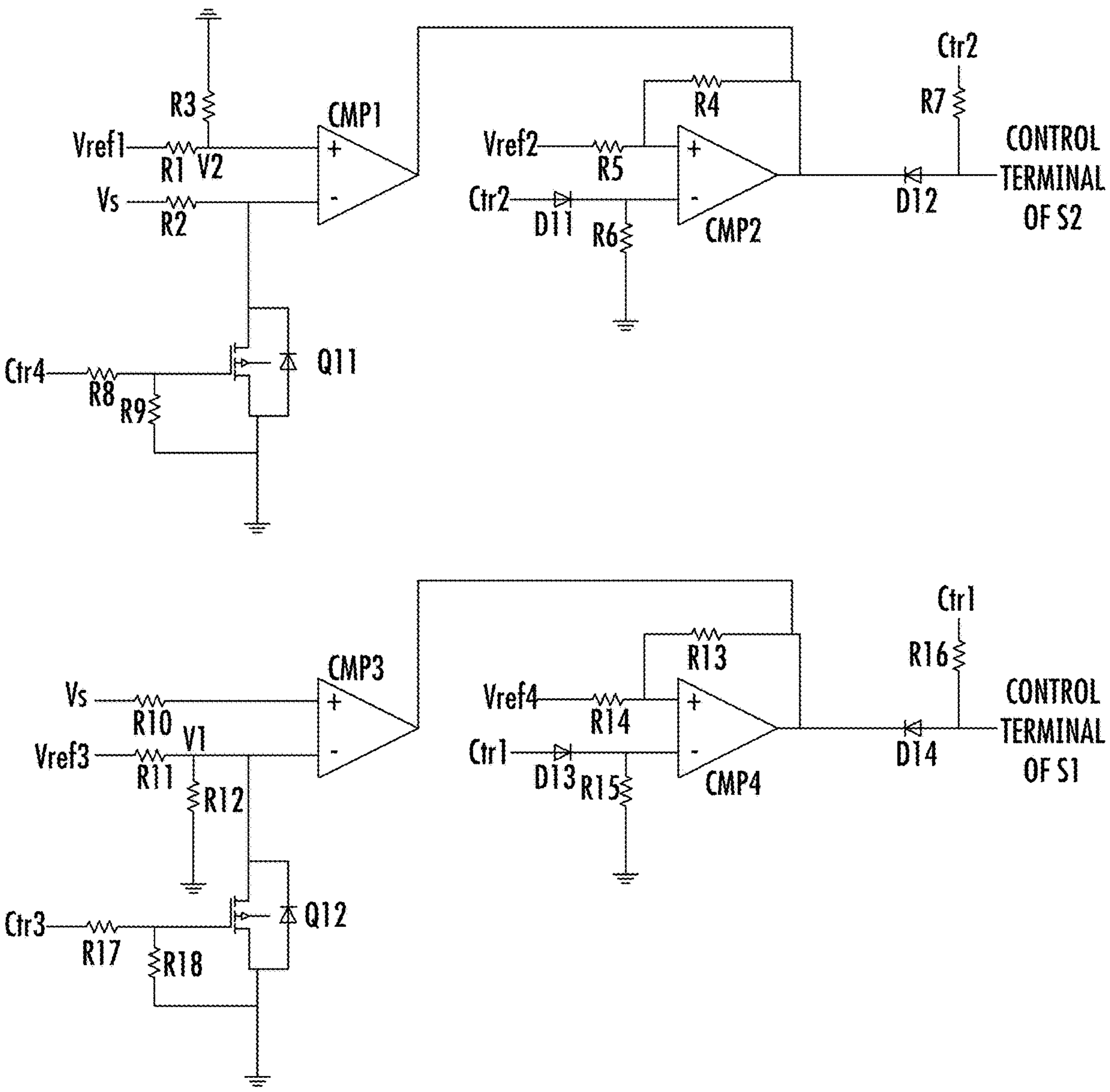
FIG. 10 is a diagram of a synchronous rectification drive circuit for totem pole PFC according to some embodiments of the present inventive concept.

FIG. 10 illustrates a synchronous rectification drive circuit for totem pole PFC according to some embodiments of the present inventive concept. The drive circuit has two parts. The upper half part of the drive circuit is connected to the control terminal of the switching transistor S2, and is configured to drive the switching transistor S2. The lower half part of the drive circuit is connected to the control terminal of the switching transistor S1, and is configured to drive the switching transistor S1.

The drive circuit of the switching transistor S2 includes a voltage comparison circuit that includes a comparator CMP1, configured to output a control signal Ctr2 to the control terminal of the switching transistor S2 when the sampling voltage Vs is less than the second voltage V2, and pull down the control terminal of the switching transistor S2 to a low level when the sampling voltage Vs is greater than the second voltage V2. In some embodiments, a non-inverting input of the comparator CMP1 is configured to receive the second voltage V2, an inverting input of the comparator CMP1 receives the sampling voltage Vs through a resistor R2, a resistor R1 is connected between a first reference voltage Vref1 (e.g., 5 V) and the second voltage V2, and a resistor R3 is connected between the second voltage V2 and the ground. A cathode of a diode D12 is connected to an output terminal of the comparator CMP1 and an anode of the diode D12 is connected to the control terminal of the switching transistor S2. The control signal Ctr2 of the switching transistor S2 is connected to the control terminal of the switching transistor S2 through a resistor R7. By configuring the first reference voltage Vref1, the resistor R1 and the resistor R3 make a voltage at the non-inverting input of the comparator CMP1 be the second voltage V2.

The drive circuit of the switching transistor S2 further includes an inverting input control circuit, configured to pull down the inverting input of the comparator CMP1 to a low level when a control signal Ctr4 of the switching transistor S4 is at a high level. In some embodiments, the inverting input control circuit includes a switching transistor Q11, the switching transistor Q11 is connected between the inverting input of the comparator CMP1 and the ground, and a control terminal of the switching transistor Q11 is connected to the control signal Ctr4 of the switching transistor S4 through a resistor R8. A resistor R9 is connected between the control terminal of the switching transistor Q11 and the ground. When the control signal Ctr4 is at a high level, the switching transistor Q11 is switched on. When the control signal Ctr4 is at a low level, the switching transistor Q11 is switched off.

In a period 0-T2, the control signal Ctr4 is at a high level, the inverting input of the comparator CMP1 is pulled down to a low level, and the voltage at the non-inverting input of the comparator CMP1 is greater than a voltage at the inverting input. Therefore, the comparator CMP1 outputs a high level, and the control signal Ctr2 is output to the switching transistor S2, where the control signal Ctr2 is the first PWM signal PWM1.

In the period T2-T3, the control signal Ctr4 is at a low level, the sampling voltage Vs is greater than the second voltage V2, and the voltage at the non-inverting input of the comparator CMP1 is less than the voltage at the inverting input. Therefore, the comparator CMP1 outputs a low level. Therefore, the control terminal of the switching transistor S2 is pulled down, and the switching transistor S2 is switched off.

In the period T3-T4, the control signal Ctr4 is at a low level, the sampling voltage Vs is less than the second voltage V2, and the voltage at the non-inverting input of the comparator CMP1 is greater than the voltage at the inverting input. Therefore, the comparator CMP1 outputs a high level, and the control signal Ctr2 is output to the switching transistor S2. In this case, the control signal Ctr2 is the fourth PWM signal PWM4.

In the period T4-T5, the control signal Ctr4 is at a low level, the sampling voltage Vs is greater than the second voltage V2, and the voltage at the non-inverting input of the comparator CMP1 is less than the voltage at the inverting input. Therefore, the comparator CMP1 outputs a low level. Therefore, the control terminal of the switching transistor S2 is pulled down, and the switching transistor S2 is switched off.

However, when the sampling voltage Vs has ripples, the sampling voltage is unstable, and there is an aperiodic change. Therefore, in one switching cycle of the control signal Ctr2 of the switching transistor S2, the switching transistor S2 may be controlled to be switched on or off for a plurality of times, which affects normal operation of the circuit. Therefore, the present inventive concept further provides a ripple control circuit.

The drive circuit of the switching transistor S2 further includes a ripple control circuit, configured to clamp an output of the comparator CMP1 at a low level or a high level in one switching cycle of the control signal Ctr2. In some embodiments, the ripple control circuit includes a comparator CMP2. A non-inverting input of the comparator CMP2 receives a second reference voltage Vref2 (for example, 5 V) through a resistor R5, an inverting input receives the control signal Ctr2 through a diode D11, and an output terminal is connected to the output terminal of the CMP1. In some embodiments, the diode D11 may be omitted. A resistor R4 is connected between the non-inverting input and the output terminal of the comparator CMP2, and a resistor R6 is connected between the inverting input of the comparator CMP2 and the ground.

It is assumed that resistance values of the resistors R4 and R5 are the same. When the comparator CMP1 outputs a low level, a voltage at the non-inverting input of the CMP2 is the second reference voltage/2 (for example, 2.5 V). In this case, the control signal Ctr2 is at a high level (when the Ctr2 is at a low level, the switching transistor S2 is switched off, and therefore this case does not need to be considered), and the voltage at the non-inverting input of the comparator CMP2 is less than a voltage at the inverting input. Therefore, the comparator CMP2 outputs a low level, that is, an output of the comparator CMP1 is clamped to a low level, the output of the comparator CMP1 does not change, and the output of the comparator CMP1 is not affected even though the sampling voltage Vs fluctuates under the action of the ripples.

When the comparator CMP1 outputs a high level, if the output of the comparator CMP1 jumps to a low level due to the presence of a ripple voltage, the comparator CMP2 clamps the output of the comparator CMP1 to a low level until the next switching cycle of the control signal Ctr2. The comparator CMP2 ensures that even when the sampling voltage Vs fluctuates near the second voltage V2, there will not be a switching cycle in which the switching transistor S2 is controlled to be switched on and off for a plurality of times.

The second reference voltage Vref2, the resistor R4, and the resistor R5 are selected as: when the comparator CMP1 outputs a low level, the voltage at the non-inverting input of the CMP2 is less than the voltage at the inverting input, and when the comparator CMP1 outputs a high level, the voltage at the non-inverting input of the CMP2 is greater than the voltage at the inverting input.

The drive circuit of the switching transistor S1 includes a voltage comparison circuit that includes a comparator CMP3, configured to output the control signal Ctr1 to the control terminal of the switching transistor S1 when the sampling voltage Vs is greater than the first voltage V1, and pull down the control terminal of the switching transistor S1 to a low level when the sampling voltage Vs is less than the first voltage V1. In some embodiments, a non-inverting input of the comparator CMP3 receives the sampling voltage Vs through a resistor R10, an inverting input of the comparator CMP3 is configured to receive the first voltage V1, a resistor R11 is connected between a third reference voltage Vref3 (e.g., 5 V) and the first voltage V1, and a resistor R12 is connected between the first voltage V1 and the ground. A cathode of a diode D14 is connected to an output terminal of the comparator CMP3 and an anode of the diode D14 is connected to the control terminal of the switching transistor S1. The control signal Ctr1 of the switching transistor S1 is connected to the control terminal of the switching transistor S1 through a resistor R16. By configuring the third reference voltage Vref3, the resistor R11 and the resistor R12 make a voltage at the inverting input of the comparator CMP3 be the first voltage V1.

The drive circuit of the switching transistor S1 further includes an inverting input control circuit, configured to pull down the inverting input of the comparator CMP3 to a low level when a control signal Ctr3 of the switching transistor S3 is at a high level. In some embodiments, the inverting input control circuit includes a switching transistor Q12, the switching transistor Q12 is connected between the inverting input of the comparator CMP3 and the ground, and a control terminal of the switching transistor Q12 receives the control signal Ctr3 of the switching transistor S3 through a resistor R17. A resistor R18 is connected between the control terminal of the switching transistor Q12 and the ground. When the control signal Ctr3 is at a high level, the switching transistor Q12 is switched on. When the control signal Ctr3 is at a low level, the switching transistor Q12 is switched off.

In the period 0-T0, the control signal Ctr3 is at a low level, the sampling voltage Vs is less than the first voltage V1, and the voltage at the non-inverting input of the comparator CMP3 is less than the voltage at the inverting input. Therefore, the comparator CMP3 outputs a low level. Therefore, the control terminal of the switching transistor S1 is pulled down, and the switching transistor S1 is switched off.

In the period T0-T1, the control signal Ctr3 is at a low level, the sampling voltage Vs is greater than the first voltage V1, and the voltage at the non-inverting input of the comparator CMP3 is greater than the voltage at the inverting input. Therefore, the comparator CMP3 outputs a high level, and the control signal Ctr1 is output to the switching transistor S1. In this case, the control signal Ctr1 is the second PWM signal PWM2.

In the period T1-T2, the control signal Ctr3 is at a low level, the sampling voltage Vs is less than the first voltage V1, and the voltage at the non-inverting input of the comparator CMP3 is less than the voltage at the inverting input. Therefore, the comparator CMP3 outputs a low level, the control terminal of the switching transistor S1 is pulled down, and the switching transistor S1 is switched off.

In the period T2-T5, the control signal Ctr3 is at a high level, the inverting input of the comparator CMP3 is pulled down to a low level, and the voltage at the non-inverting input of the comparator CMP3 is greater than the voltage at the inverting input. Therefore, the comparator CMP3 outputs a high level, and the control signal Ctr1 is output to the switching transistor S1, where the control signal Ctr1 is the third PWM signal PWM3.

However, when the sampling voltage has ripples, the sampling voltage is unstable, and there is an aperiodic change. Therefore, in one switching cycle of the control signal Ctr1 of the switching transistor S1, the switching transistor S1 may be controlled to be switched on or off for a plurality of times, which affects normal operation of the circuit. Therefore, the present inventive concept further provides a ripple control circuit.

The drive circuit of the switching transistor S1 further includes a ripple control circuit, configured to clamp an output of the comparator CMP3 at a low level or a high level in one switching cycle of the control signal Ctr1. In some embodiments, the ripple control circuit includes a comparator CMP4. A non-inverting input of the comparator CMP4 receives a fourth reference voltage Vref4 (for example, 5 V) through a resistor R14, an inverting input receives the control signal Ctr1 through a diode D13, and an output terminal is connected to the output terminal of the CMP3. A resistor R13 is connected between the non-inverting input and the output terminal of the comparator CMP4, and a resistor R15 is connected between the inverting input of the comparator CMP2 and the ground.

It is assumed that resistance values of the resistors R14 and R13 are the same. When the comparator CMP3 outputs a low level, a voltage at the non-inverting input of the CMP4 is the fourth reference voltage/2 (for example, 2.5 V). In this case, the control signal Ctr1 is at a high level (when the Ctr1 is at a low level, the switching transistor S1 is switched off, and therefore this case does not need to be considered), and the voltage at the non-inverting input of the comparator CMP4 is less than a voltage at the inverting input. Therefore, the comparator CMP4 outputs a low level, that is, an output of the comparator CMP3 is clamped to a low level, and the output of the comparator CMP3 is not affected even though the sampling voltage Vs fluctuates under the action of the ripples.

When the comparator CMP3 outputs a high level, if the output of the comparator CMP3 jumps to a low level due to the presence of a ripple voltage, the comparator CMP4 will clamp the output of the comparator CMP3 to a low level until the next switching cycle of the control signal Ctr1. The comparator CMP4 ensures that even when the sampling voltage Vs fluctuates near the first voltage V1, there will not be a switching cycle in which the switching transistor S1 is controlled to be switched on and off for a plurality of times.

The fourth reference voltage Vref4, the resistor R14, and the resistor R13 are selected as: when the comparator CMP3 outputs a low level, the voltage at the non-inverting input of the CMP4 is less than the voltage at the inverting input, and when the comparator CMP3 outputs a high level, the voltage at the non-inverting input of the CMP4 is greater than the voltage at the inverting input.

In some embodiments, if the ripples of the sampling voltage can be removed in another manner, the ripple control circuit may also be omitted.

Figure 11:
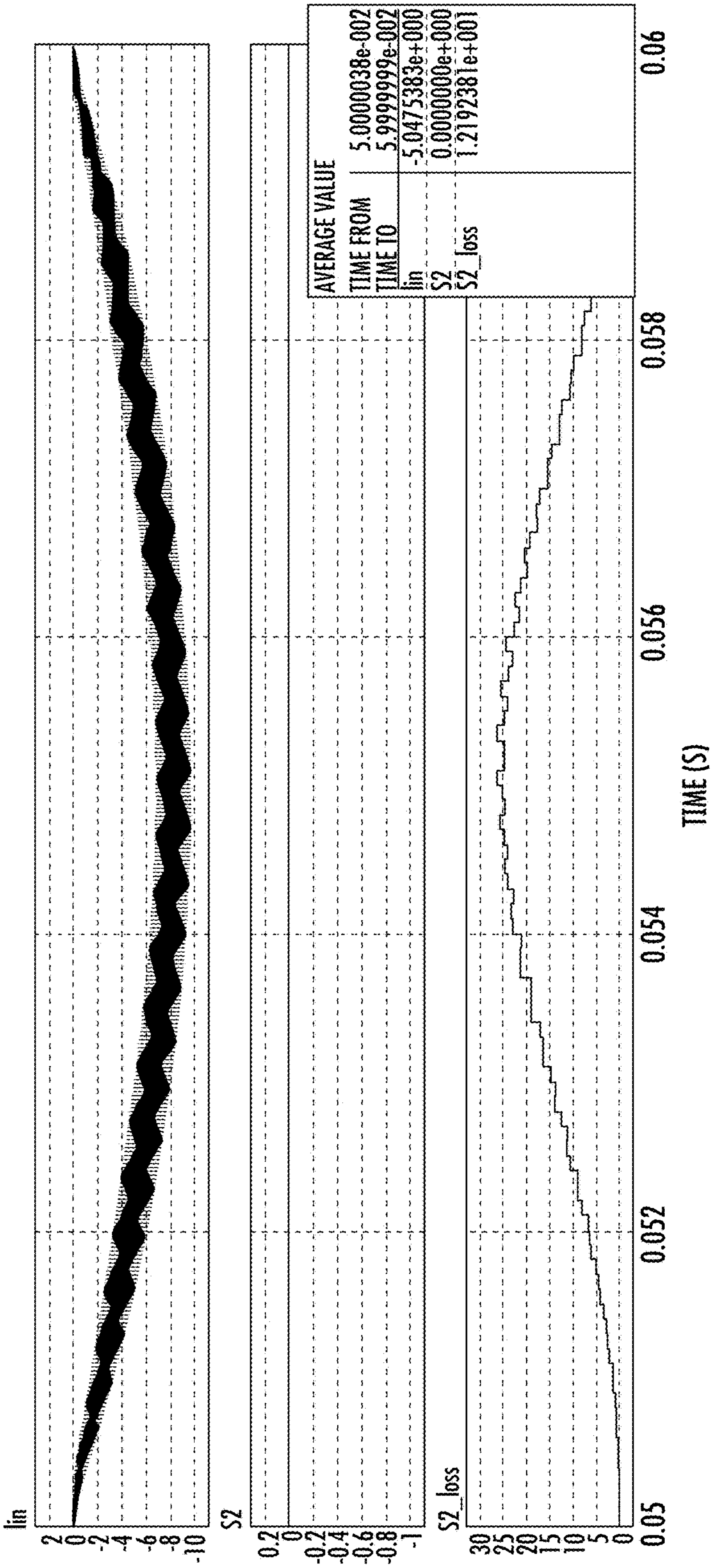
FIG. 11 illustrates a loss simulation result of the totem pole PFC circuit illustrated in FIG. 1.
Figure 12:
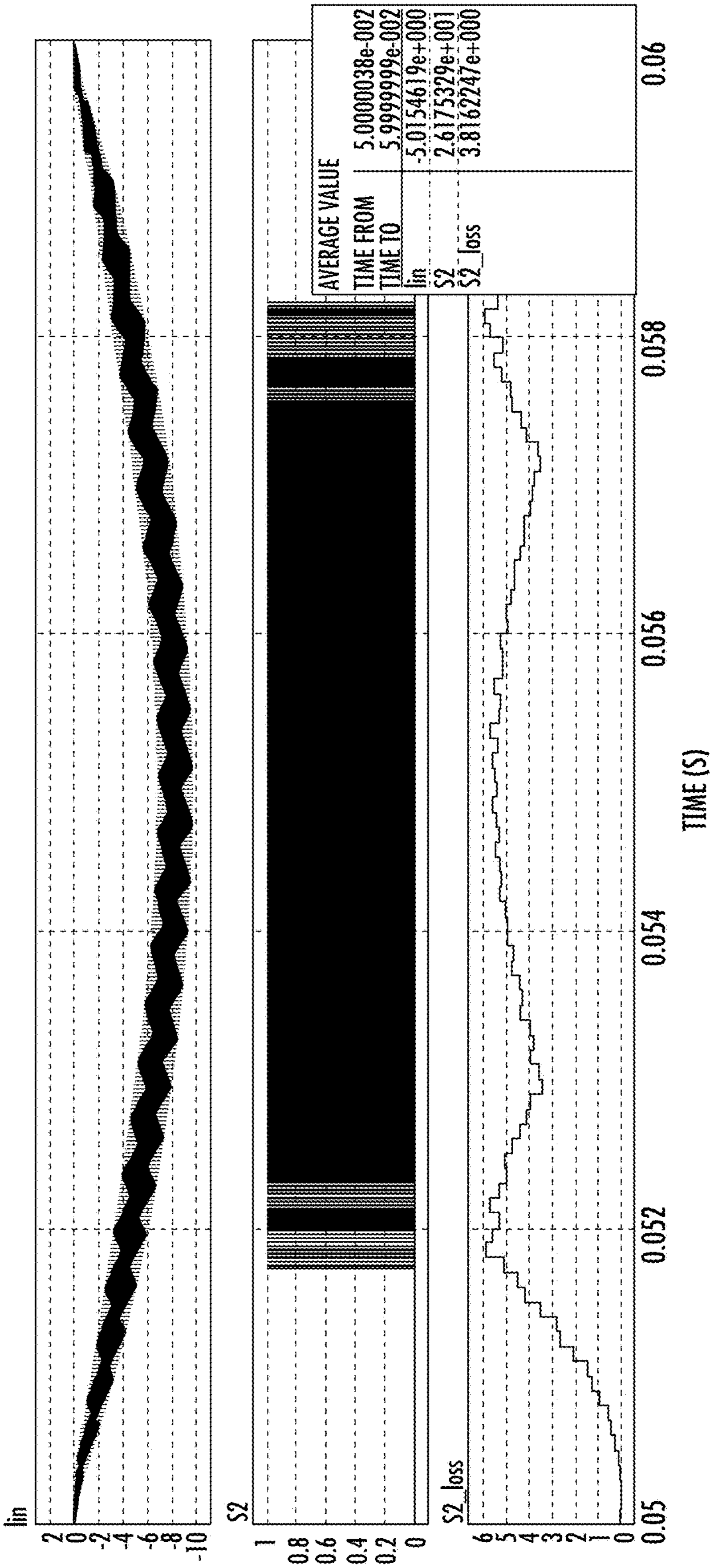
FIG. 12 illustrates a loss simulation result obtained using a synchronous rectification drive method for totem pole PFC according to the present inventive concept.

FIG. 11 illustrates a loss simulation result of the totem pole PFC circuit illustrated in FIG. 1. The power supply voltage is 160 V, a voltage across the capacitor $C_{BUS}$ is 360 V, a load of PFC is 1 KW, and the switching transistors S1 and S2 use Sic Mos devices C3M0045065K. When the drive method and the drive circuit of the present inventive concept are not used, a simulation analysis shows that a loss of the switching transistor S2 during freewheeling is 12.19 W. FIG. 12 illustrates a loss simulation result obtained using a synchronous rectification drive method for totem pole PFC according to the present inventive concept. A simulation analysis shows that a loss of the switching transistor S2 during freewheeling is 3.81 W (an inductor current is greater than 5 A, and a synchronous rectification PWM signal is input).

According to the synchronous rectification drive method and drive circuit for totem pole PFC in the present inventive concept, a loss of a switching transistor during freewheeling can be reduced, and efficiency of a system can be improved. In addition, the synchronous rectification drive method and drive circuit for totem pole PFC in the present inventive concept are simple to control. When a power supply is zero-crossing or under light load, there is no discharge from a direct current bus to the power supply, so that there is no loss of energy on the direct current bus, thereby improving overall efficiency.

Although the present inventive concept has been described by using preferred embodiments, the present inventive concept is not limited to the embodiments described herein, and includes various changes and variations without departing from the scope of the present inventive concept.

What is claimed is:

1. A synchronous rectification drive method for totem pole power factor correction (PFC), the totem pole PFC comprising a first branch having a first switching transistor and a second switching transistor connected in series and a second branch having a third switching transistor and a fourth switching transistor connected in series, and the first branch being connected in parallel with the second branch, wherein the drive method comprises:

in a positive half-cycle, providing a first pulse width modulation (PWM) signal to a control terminal of the second switching transistor, switching on the fourth switching transistor, switching off the first switching transistor and the third switching transistor first, and when a sampling voltage on an inductor is greater than a predetermined first voltage, providing a second PWM signal to a control terminal of the first switching transistor, wherein the second PWM signal is opposite to the first PWM signal; and in a negative half-cycle, providing a third PWM signal to the control terminal of the first switching transistor, switching on the third switching transistor, switching off the second switching transistor and the fourth switching transistor first, and when the sampling voltage on the inductor is less than a predetermined second voltage, providing a fourth PWM signal to the control terminal of the second switching transistor, wherein the fourth PWM signal is opposite to the third PWM signal, wherein, the first voltage and the second voltage are initially set as voltages at 50% of an amplitude of the sampling voltage on the inductor, in a process of the drive method, the first voltage and the second voltage are selected to maximize efficiency.

2. A synchronous rectification drive circuit for totem pole power factor correction (PFC), the totem pole PFC comprising a first branch having a first switching transistor and a second switching transistor connected in series and a second branch having a third switching transistor and a fourth switching transistor connected in series, and the first branch being connected in parallel with the second branch, wherein the drive circuit comprises:

a first switching transistor drive circuit, comprising:

a first voltage comparison circuit, comprising a third comparator, configured to output a first control signal to a control terminal of the first switching transistor when a sampling voltage of an inductor is greater than a first voltage, and pull down the control terminal of the first switching transistor to a low level when the sampling voltage is less than the first voltage; and a first inverting input control circuit, configured to pull down an inverting input of the third comparator to a low level when a third control signal of the third switching transistor is at a high level; and a second switching transistor drive circuit, comprising:

a second voltage comparison circuit, comprising a first comparator, configured to output a second control signal to a control terminal of the second switching transistor when the sampling voltage is less than a second voltage, and pull down the control terminal of the second switching transistor to a low level when the sampling voltage is greater than the second voltage; and a second inverting input control circuit, configured to pull down an inverting input of the first comparator to a low level when a fourth control signal of the fourth switching transistor is at a high level.

3. The synchronous rectification drive circuit for totem pole PFC of claim 2, wherein a non-inverting input of the third comparator is configured to receive the sampling voltage, an inverting input of the third comparator is configured to receive the first voltage, and the first voltage comparison circuit further comprises:

a tenth resistor, connected between the non-inverting input of the third comparator and the sampling voltage;

a fourteenth diode, connected between an output terminal of the third comparator and the control terminal of the first switching transistor; and a sixteenth resistor, connected between the first control signal and the control terminal of the first switching transistor.

4. The synchronous rectification drive circuit for totem pole PFC of claim 2, wherein the first inverting input control circuit further comprises:

a twelfth switching transistor, connected between the inverting input of the third comparator and a ground;

a seventeenth resistor, connected between a control terminal of the twelfth switching transistor and the third control signal; and an eighteenth resistor, connected between the control terminal of the twelfth switching transistor and the ground.

5. The synchronous rectification drive circuit for totem pole PFC of claim 2, wherein a non-inverting input of the first comparator is configured to receive the second voltage, an inverting input of the first comparator is configured to receive the sampling voltage, and the second voltage comparison circuit further comprises:

a second resistor, connected between the inverting input of the first comparator and the sampling voltage;

a twelfth diode, connected between an output terminal of the first comparator and the control terminal of the second switching transistor; and a seventh resistor, connected between the second control signal and the control terminal of the second switching transistor.

6. The synchronous rectification drive circuit for totem pole PFC of claim 2, wherein the second inverting input control circuit further comprises:

an eleventh switching transistor, connected between the inverting input of the first comparator and a ground;

an eighth resistor, connected between a control terminal of the eleventh switching transistor and the fourth control signal; and a ninth resistor, connected between the control terminal of the eleventh switching transistor and the ground.

7. The synchronous rectification drive circuit for totem pole PFC of claim 2, wherein the first switching transistor drive circuit further comprises a first ripple control circuit, configured to clamp an output of the third comparator in one switching cycle of the first control signal.

8. The synchronous rectification drive circuit for totem pole PFC of claim 7, wherein the first ripple control circuit comprises:

a fourth comparator, wherein a non-inverting input of the fourth comparator is configured to receive a fourth reference voltage, an inverting input of the fourth comparator is configured to receive the first control signal, and an output terminal of the fourth comparator is connected to an output terminal of the third comparator;

a fourteenth resistor, connected between the non-inverting input of the fourth comparator and the fourth reference voltage;

a thirteenth resistor, connected between the non-inverting input of the fourth comparator and an output terminal of the fourth comparator; and a fifteenth resistor, connected between the inverting input of the fourth comparator and a ground;

wherein the fourth reference voltage, the fourteenth resistor, and the thirteenth resistor are selected as: when the third comparator outputs a low level, a voltage at the non-inverting input of the fourth comparator is less than a voltage at the inverting input of the fourth comparator, and when the third comparator outputs a high level, the voltage at the non-inverting input of the fourth comparator is greater than the voltage at the inverting input of the fourth comparator.

9. The synchronous rectification drive circuit for totem pole PFC of claim 2, wherein the second switching transistor drive circuit further comprises a second ripple control circuit, configured to clamp an output of the first comparator in one switching cycle of the second control signal.

10. The synchronous rectification drive circuit for totem pole PFC of claim 9, wherein the second ripple control circuit comprises:

a second comparator, wherein a non-inverting input of the second comparator is configured to receive a second reference voltage, an inverting input of the second comparator is configured to receive the second control signal, and an output terminal of the second comparator is connected to an output terminal of the first comparator;

a fifth resistor, connected between the non-inverting input of the second comparator and the second reference voltage;

a fourth resistor, connected between the non-inverting input of the second comparator and the output terminal of the second comparator; and a sixth resistor, connected between the inverting input of the second comparator and a ground;

wherein the second reference voltage, the fourth resistor, and the fifth resistor are selected as: when the first comparator outputs a low level, a voltage at the non-inverting input of the second comparator is less than a voltage at the inverting input of the second comparator, and when the first comparator outputs a high level, the voltage at the non-inverting input of the second comparator is greater than the voltage at the inverting input of the second comparator.

* * * * *